(12) United States Patent  
Bazan et al.

(10) Patent No.: US 8,439,800 B1
(45) Date of Patent: May 14, 2013

(54) MARINE DRIVE SHIFT CONTROL SYSTEM

(75) Inventors: Andrew H. Bazan, Charleston, SC (US);
Kyle M. Miller, Charleston, SC (US);
William J. Samples, Charleston, SC (US); Doyle E. Whittington, Jr., Charleston, SC (US); Chih-hua Liang, Charleston, SC (US)

(73) Assignee: Brunswick Corporation, Lake Forest, IL (US)

( * ) Notice: Subject to any disclaimer, the term of this patent is extended or adjusted under 35 U.S.C. 154(b) by 281 days.

(21) Appl. No.: 12/956,804

(22) Filed: Nov. 30, 2010

(51) Int. Cl.
*B60W 10/00* (2006.01)

(52) U.S. Cl.
USPC .............................. 477/77; 477/180

(58) Field of Classification Search ............. 477/70, 477/77, 83, 84, 86, 90, 115, 166, 174, 180, 477/181
See application file for complete search history.

(56) References Cited

U.S. PATENT DOCUMENTS

| 4,688,665 | A  | * | 8/1987 | Rowen | 477/176 |
|---|---|---|---|---|---|
| RE32,998 | E  |   | 7/1989 | Davis | |
| 6,062,360 | A  |   | 5/2000 | Shields | |
| 6,176,750 | B1 |   | 1/2001 | Alexander et al. | |
| 6,679,740 | B1 | * | 1/2004 | Imanaka et al. | 440/75 |
| 6,942,530 | B1 |   | 9/2005 | Hall et al. | |
| 7,722,500 | B2 | * | 5/2010 | Sato et al. | 477/174 |
| 2002/0187877 | A1 | * | 12/2002 | Skupinski et al. | 477/115 |

* cited by examiner

*Primary Examiner* — Justin Holmes
(74) *Attorney, Agent, or Firm* — Andrus, Sceales, Starke & Sawall, LLP

(57) ABSTRACT

A shift control system for a marine drive applies partial clutch engagement pressure upon initial shifting from forward to reverse to prevent stalling of the engine otherwise caused by applying full clutch engagement pressure upon shifting from forward to reverse.

10 Claims, 1 Drawing Sheet

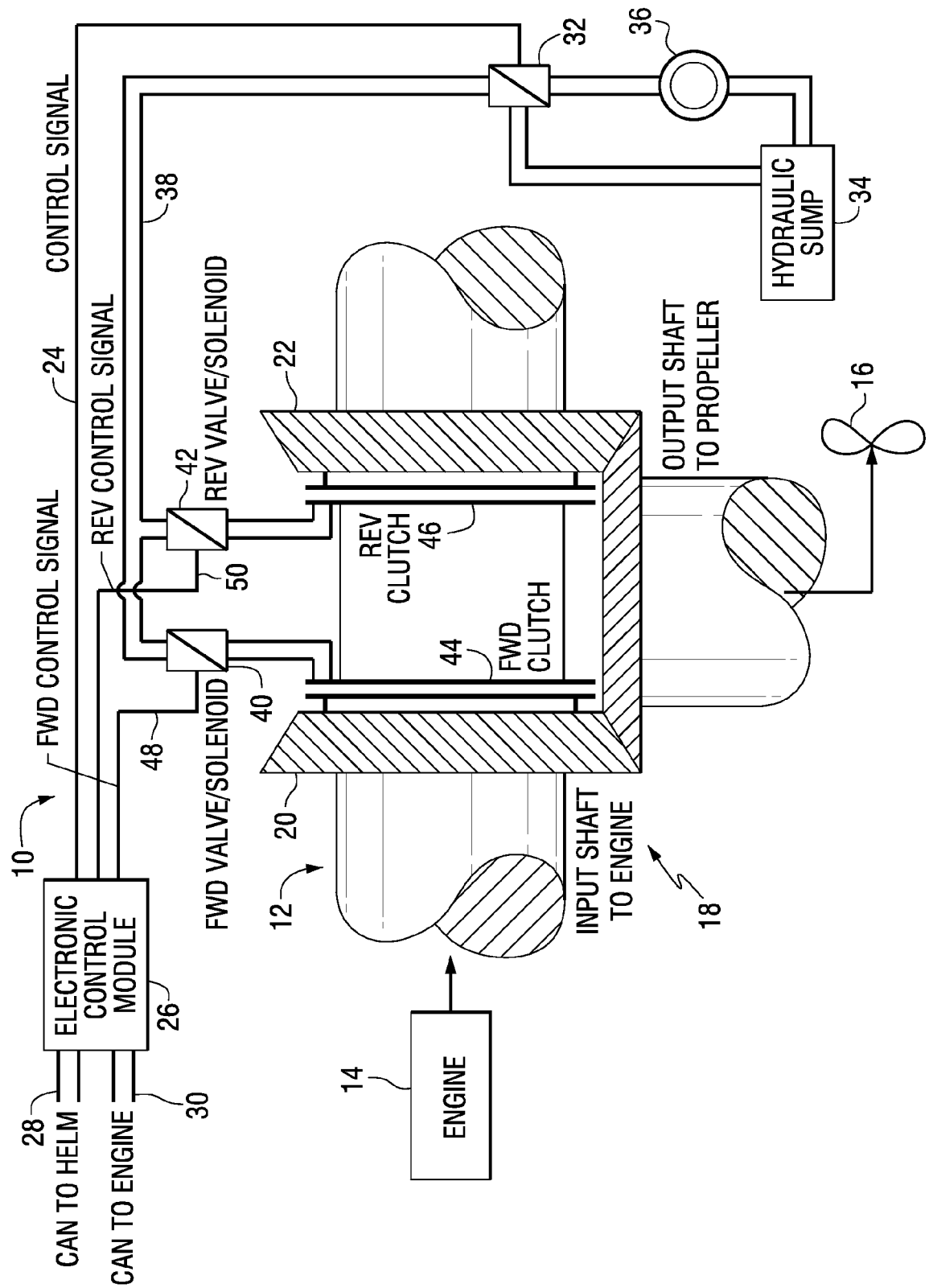

MARINE DRIVE SHIFT CONTROL SYSTEM

BACKGROUND AND SUMMARY

The invention relates to marine drives, and more particularly to a marine drive shift control system.

Marine drives typically have an internal combustion engine driving a propulsor through a transmission shiftable between forward and reverse in clutched engagement with forward and reverse gears, respectively. When the transmission is shifted from forward gear, particularly wide open throttle, to reverse gear, engine speed drops significantly more quickly than vessel over water speed. The latter is directly proportional to the propeller speed when free wheeling in neutral gear. The difference in engine speed (and consequently transmission input speed) and the vessel over water speed (and consequently propeller speed and transmission output speed) causes a high rotational speed difference (e.g. up to 2,000 rpm) in the clutch mechanism of the transmission during entry into reverse gear. The action of closing the reverse clutch under full pressure at these high rotational speed differences can cause engine stalling and increased wear on major driveline components. Current production methods utilize full gear pressure when closing the clutch, regardless of vessel or propeller speeds. Save for troll mode, there is no allowance for slip during clutch engagement. One known solution is the use of speed over ground from a global positioning system antenna to limit entry into reverse gear. Another solution uses engine torque control for a similar goal.

The present invention arose during continuing development efforts in the above technology.

BRIEF DESCRIPTION OF THE DRAWING

Sole FIG. 1 illustrates a marine drive shift control system in accordance with the invention.

DETAILED DESCRIPTION

FIG. 1 shows a shift controller 10 for a marine drive 12 having an internal combustion engine 14 driving a propulsor such as propeller 16 through a transmission 18 shiftable between forward and reverse gears 20 and 22, respectively, as is known. In one embodiment, the shift controller uses the troll control signal at 24 from ECM (electronic control module) 26 which communicates with the helm and the engine via respective CAN buses 28 and 30, as is known, which troll control signal at 24 controls valve/solenoid 32 to supply hydraulic fluid from sump 34 and pump 36 at supply line 38 to apply limited hydraulic clutch pressure in forward and/or reverse through respective forward and reverse valve/solenoids 40 and 42 to respective forward and reverse clutches 44 and 46 as controlled by respective forward and reverse control signals at 48 and 50 from ECM 26, as is known.

In the present system, the noted shift controller is also used to apply partial clutch engagement pressure upon initial shifting from forward to reverse to prevent stalling the engine otherwise caused by applying full clutch engagement pressure upon shifting from forward to reverse. In one embodiment, the method involves allowing a given percent clutch slip upon the noted initial shifting from forward to reverse. In another embodiment, the method involves applying partial clutch engagement pressure in response to time rate of shift change from forward to reverse. In another embodiment, the method involves applying partial clutch engagement pressure in response to engine speed. In another embodiment, the method involves applying partial clutch engagement pressure in response to propulsor speed. In another embodiment, the method involves applying partial clutch engagement pressure in response to the ratio of engine speed versus propulsor speed. In another embodiment, the method involves applying full clutch engagement pressure only after initial shifting.

Using the noted method to close the clutch more slowly results in a prompt shift event free of clutch chatter, propeller cavitation, and engine stall. Propeller speed, as evidenced by transmission output speed, is decreased at a rate sustainable by the engine idle speed governor while decelerating the vessel continuously. The system may be used with various marine drives and transmissions, including outboards, stern drives, inboard transmissions, and pod drives.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A method of preventing stalling in a marine drive having an internal combustion engine driving a propulsor through a transmission shiftable between forward and reverse in clutched engagement with forward and reverse gears, respectively, said method comprising applying clutch engagement pressure upon initial shifting from forward to reverse to prevent stalling said engine otherwise caused by applying full clutch engagement pressure upon shifting from forward to reverse, comprising applying said partial clutch engagement pressure in response to time rate of shift change from forward to reverse.

2. The method according to claim 1 comprising allowing a given percent clutch slip upon said initial shifting from forward to reverse.

3. The method according to claim 1 comprising applying full clutch engagement pressure after said initial shifting.

4. The method according to claim 1 comprising applying said partial clutch engagement pressure to decrease propulsor speed at a sustainable rate.

5. The method according to claim 1 comprising applying said partial clutch engagement pressure to decrease propulsor speed at a rate sustainable by an engine idle speed governor in a marine vessel while decelerating the vessel continuously.

6. A shift controller for a marine drive having an internal combustion engine driving a propulsor through a transmission shiftable between forward and reverse in clutched engagement with forward and reverse gears, respectively, said shift controller applying partial clutch engagement pressure upon initial shifting from forward to reverse to avert stalling of said engine otherwise caused by application of full clutch engagement pressure upon shifting from forward to reverse, wherein said shift controller applies said partial clutch engagement pressure in response to time rate of shift change from forward to reverse.

7. The shift controller according to claim 6 wherein said shift controller allows a given percent clutch slip upon said initial shifting from forward to reverse.

8. The shift controller according to claim 6 wherein said shift controller applies tail clutch engagement pressure after said initial shifting.

9. The shift controller according to claim 6 wherein said shift controller applies said partial clutch engagement pressure to decrease propulsor speed at a sustainable rate.

10. The shift controller according to claim 6 wherein said shift controller applies said partial clutch engagement pressure to decrease propulsor speed at a rate sustainable by an engine idle speed governor in a marine.

* * * * *